United States Patent [19]
Powell

[11] Patent Number: 6,118,979
[45] Date of Patent: Sep. 12, 2000

[54] METHOD FOR SIGNALING AN INCOMING TELEPHONE CALL WITHOUT AN AUDIBLE SIGNAL

[75] Inventor: Bryan S. Powell, Delray Beach, Fla.

[73] Assignee: Robert B. Nicholson, III, Oak Ridge, N.J.; a part interest

[21] Appl. No.: 08/755,316

[22] Filed: Nov. 22, 1996

[51] Int. Cl.⁷ ................................................ H04Q 7/06
[52] U.S. Cl. ........................................ 455/31.2; 379/418
[58] Field of Search ........................... 455/31.2, 39, 567; 379/373, 376, 418

[56] References Cited

U.S. PATENT DOCUMENTS

| | | | |
|---|---|---|---|
| 3,911,416 | 10/1975 | Feder | 340/825.46 |
| 4,229,744 | 10/1980 | Luedtke et al. | 343/769 |
| 4,661,972 | 4/1987 | Kai | 455/31.2 |
| 4,931,765 | 6/1990 | Rollins et al. | 340/407.1 |
| 5,007,105 | 4/1991 | Kudoh et al. | 455/344 |
| 5,172,092 | 12/1992 | Nguyen et al. | 340/311.1 |
| 5,189,389 | 2/1993 | DeLuca et al. | 340/311.1 |
| 5,353,017 | 10/1994 | Suzuki et al. | 340/825.46 |
| 5,642,413 | 6/1997 | Little | 379/373 |
| 5,848,362 | 12/1998 | Yamashita | 455/567 |
| 5,867,796 | 2/1999 | Inutsuka | 455/567 |

FOREIGN PATENT DOCUMENTS 8-65745  3/1996  Japan .

*Primary Examiner*—Andrew M. Dolinar
*Attorney, Agent, or Firm*—Zarley, McKee, Thomte, Voorhees & Sease

[57] ABSTRACT

A method of communicating an incoming call through a telephone receiver having an incoming call circuit and an audible signal system operatively connected to the circuit. The incoming call is communicated to a person remotely located from the receiver. The method comprises disconnecting the audible signal system, and placing on the person a pager having a receiver circuit capable of sensing the existence of an incoming call destined for the incoming call circuit of the telephone receiver. The pager having a silent announcer thereon operatively connected to the receiver circuit of the pager. Thus, the presence of an incoming call can be transmitted to the receiver circuit of the pager to actuate the vibrator without actuating the audible signal system of the telephone receiver.

3 Claims, 2 Drawing Sheets

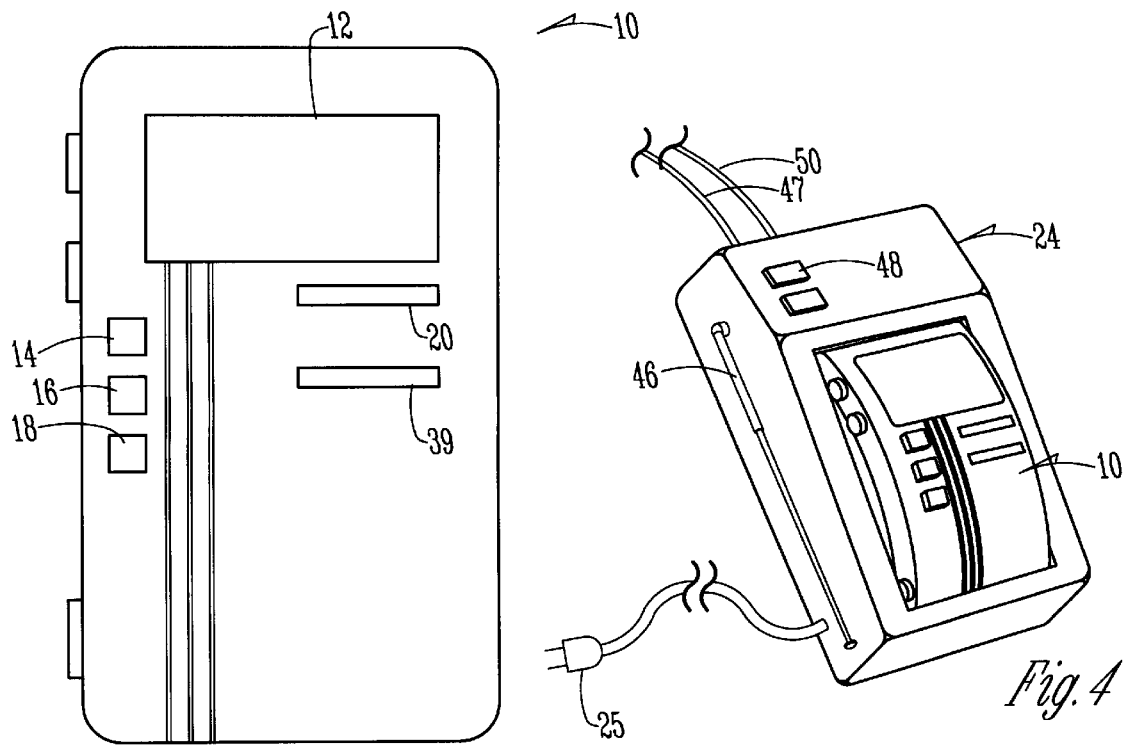
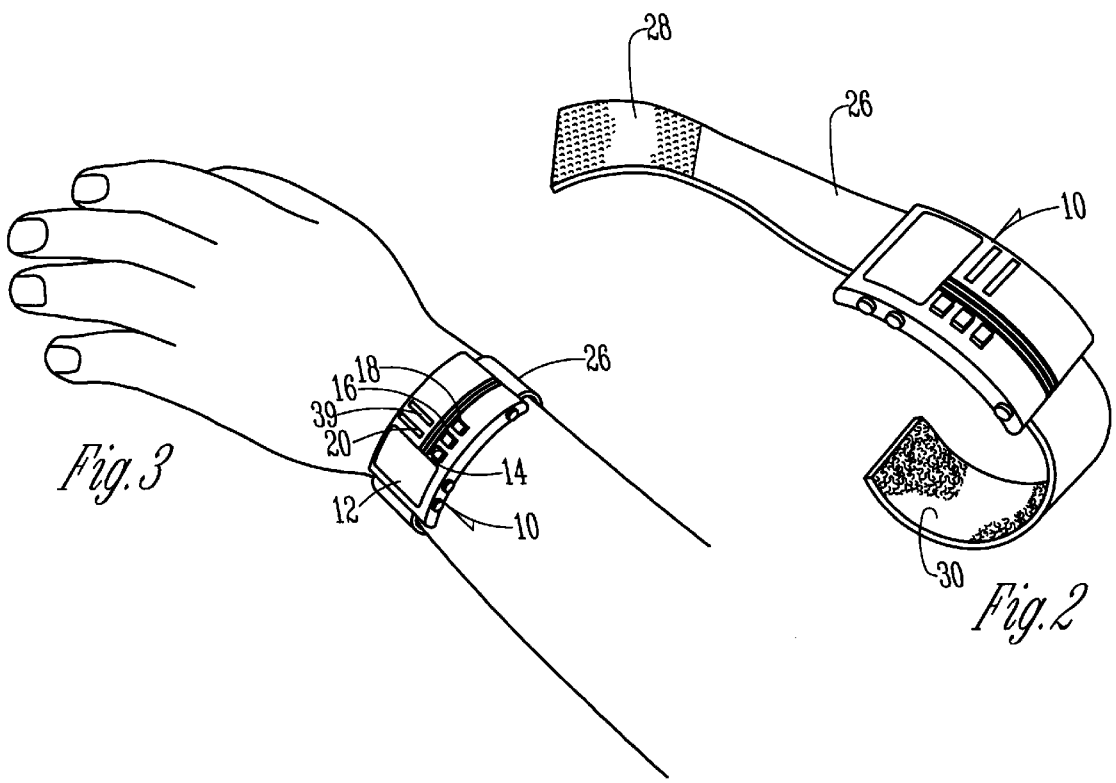

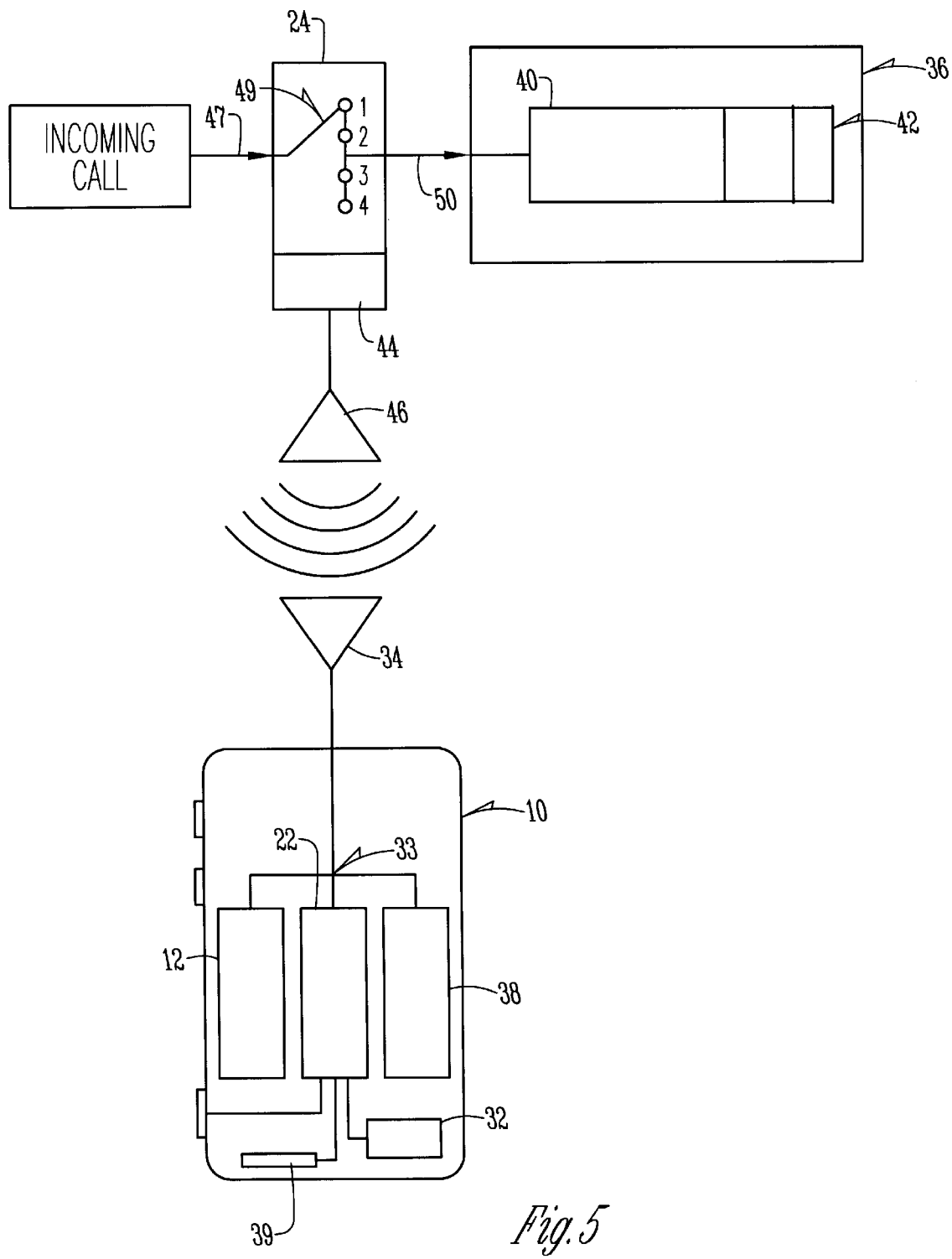

METHOD FOR SIGNALING AN INCOMING TELEPHONE CALL WITHOUT AN AUDIBLE SIGNAL

BACKGROUND OF THE INVENTION

The present invention relates to the field of communication. More particularly, this invention relates to telephone communication devices and a method of silently communicating an incoming call to a person located remote from the telephone receiver. The audible signal system of the telephone is disconnected and replaced by a wireless receiver worn by the person expecting a call. The wireless receiver gives the wearer a non-audible signal to indicate the presence of the incoming call.

Conventional telephones generally have a ringer or an audible signal system to announce an incoming call. However, the audible signal (bell, buzzer, tone, etc.) can disturb others, such as sleeping partners, children or guests. The ringing telephone often disrupts important home or business events.

In addition, the range of an audible signal is severely limited and can be drowned out by other noises. For instance, many teenagers are eager to receive incoming telephone calls. However, they are often engrossed in listening to loud music in their rooms or wearing a portable stereo device such as a "Walkman."

The basic telephone having an audible incoming call signaling system is well known in the art. So are pagers, which receive calls from a telephone and display a number for the carrier to call in order to retrieve a message. However, none of these devices utilize a non-audible detector located remotely from the receiver to replace or supplant the audible signal system of the receiver.

Therefore, a primary object of the present invention is the provision of a non-audible method for communicating the presence of an incoming call at a remote telephone receiver.

A further object of the present invention is the provision of a wireless receiver capable of sensing the existence of an incoming call at a remote telephone receiver, and having a vibration device thereon for notifying the carrier of the incoming call without actuating the audible signal system of the telephone receiver.

A further object of the present invention is the provision of a wireless receiver capable of sensing the existence of an incoming call at a remote telephone receiver, and having a strobe light device thereon for notifying the carrier of the incoming call without actuating the audible signal system of the telephone receiver.

A further object of the present invention is the provision of a method of communicating an incoming signal that will alert the carrier of an incoming call received while he/she is outside the audible range of the receiver.

A further object of the present invention is the provision of a method of communicating an incoming call despite the noise level surrounding the carrier.

A further object of the present invention is the provision of a method of communicating an incoming call which will not disturb a sleeping baby or spouse who is in close proximity to the telephone receiver.

A further object of the present invention is the provision of a personal vibrating communicator worn around the wrist of the carrier to alert the carrier of incoming telephone calls.

A further object of the present invention is the provision of a method of communicating an incoming call which will give the carrier a greater mobility and flexibility in his/her activities without missing incoming telephone calls.

These and other objects will become apparent based upon the drawings, description, and claims which follow.

SUMMARY OF THE INVENTION

The present invention relates to communication, more particularly, to a method of communicating an incoming telephone signal. The telephone receiver has an incoming call circuit with an audible signal system operatively connected thereto. The method comprises disconnecting the audible signal system of the receiver and placing a vibrating wireless receiver or pager on the person who is expecting a call. The pager has a receiver circuit capable of sensing the existence of an incoming call on the incoming call circuit of the telephone receiver. The pager also has a vibrator thereon operatively connected to the receiver circuit of the pager. Thus, an incoming call will be transmitted to the incoming call circuit and thence to the receiver circuit of the pager to actuate the vibrator without actuating the audible signal system of the telephone receiver. A strobe light can also supplement or replace the vibrator as a non-audible means for announcing the call. Those around the telephone receiver are not disturbed by the incoming call, and yet the person expecting the call (wearing the pager) is notified of the incoming call.

BRIEF DESCRIPTION OF THE DRAWINGS

FIG. 1 is a top plan view of the incoming call detector of the present invention.

FIG. 2 is a perspective view of the incoming call detector of FIG. 1 mounted on a strap.

FIG. 3 is a perspective view of the incoming call detector of FIG. 2 strapped to the user's wrist.

FIG. 4 is a perspective view of the incoming call detector of this invention being recharged in a recharging unit.

FIG. 5 is a diagrammatic view of the incoming call detector of this invention.

DETAILED DESCRIPTION OF THE PREFERRED EMBODIMENT

The wireless receiver for carrying out the present invention is generally designated in the drawings by the reference numeral 10. As seen in FIG. 1, the wireless receiver 10 is similar to a standard conventional pager. However, the wireless receiver 10 of this invention has a new use.

The wireless receiver or pager 10 has a liquid crystal display 12 (see also FIG. 5) for optionally showing the caller identification of the incoming call. Depending on the capabilities of the pager 10, the display 12 can also be used to retrieve telephone numbers, addresses, calendar information and the like from an internal memory. Control buttons 14,16,18 can be utilized to control the various functions of the pager 10.

The wireless receiver or pager 10 also includes a low battery indicator light 20. When the battery 22 of the pager 10 is low on charge, the indicator light 20 will signal the carrier that it is time to recharge the battery 22 in the battery charger 24 as shown in FIG. 4. The charger 24 utilizes power drawn from a conventional 110 volt outlet (not shown) by a power cord 25. The battery recharger is a cradle-style 110 volt charger with an antenna 46 for transmitting a radio frequency signal to the pager 10. Conventional electrical contacts on the pager 10 and the battery charger 24 provide the necessary electrical connections for the charging process.

The pager 10 of the present invention mounts on a nylon band or strap 26 as shown in FIG. 2. The strap 26 includes hooks and loops fasteners 28 and 30 respectively, on the ends of the strap 26. The fasteners 28,30 allow the strap 26 to be placed or securely fastened around the wrist of the carrier as shown in FIG. 2. The pager 10 is lightweight and streamlined, enabling it to be worn around the wrist of the user like a wrist watch. Preferably the pager 10 is also water resistant, like many modern wrist watches.

FIG. 5 illustrates some other features of the pager 10. The pager 10 includes a sounder 32 electrically connected to the battery 22 and a receiver circuit 33. The sounder 32 responds to a remote signal received by the antenna 34 of the pager 10. Such a signal can be sent from the charger 24 when the pager 10 has been lost or misplaced. When the "lost pager" signal is sent, the antenna 34 picks up the signal and the sounder 32 makes an audible beeping or buzzing sound to enable the user to find the pager 10 if it is in close proximity.

The pager 10 also includes a vibrator 38 electrically connected to the battery 22 and the receiver circuit 33. The vibrator 38 causes a perceptible shaking action of the entire pager 10 or a portion thereof which is in contact with the carrier. The sounder 32 and the vibrator 38 are electrically isolated so that the signal which causes the sounder 32 to emit sounds does not normally cause the vibrator 38 to vibrate. For instance, this can be done by utilizing signals of different frequencies.

A small but bright strobe light 39 is also provided on the face of the pager 10. The light 39 and/or the vibrator can announce the incoming call. The strobe light 39 is useful when the user is hearing-impaired and accustomed to such stimuli, exposed to other vibrations (like working with a jack hammer or hedge trimmer), or merely desires redundancy in announcing incoming calls.

FIG. 5 also illustrates the activation of the vibrator 38 and/or the strobe light 39. The telephone receiver 36 has an incoming call circuit 40. Normally, in conventional telephone receivers, the incoming call circuit 40 has an audible signal system 42, such as a ringer or buzzer electrically connected thereto. However, in the present invention, the incoming call signal can be prevented by the four-position switch 49 from reaching the audible signal system 42. Thus, in position 1 of the switch 49 the telephone receiver 36 will not ring or buzz in response to an incoming call. Instead, a transmitter 44 sends a signal through a pivotal and extensible antenna 46 to the pager 10. In position 2 of switch 49 the telephone receiver 36 will ring and the call will also be announced to the remote user by the pager 10. In position 3 of switch 49 only the telephone receiver 36 will announce an incoming call. With the switch 49 in position 4 neither the receiver 36 or the pager 10 will announce incoming calls.

The incoming call comes in to the charger 24 through a conventional telephone line 47 and a similar line 50 connects the charger 24 to the incoming call circuit 40 of the telephone receiver 36.

The antenna 34 of the pager 10 picks up the signal sent by the transmitter 44, as long as it is within range. The signal of the incoming call is processed by the receiver circuit 33 of the pager 10 and sent to the vibrator 38 and/or the strobe light 39, which silently alerts the carrier to the existence of the incoming call.

This silent method of communicating an incoming call to a person remotely located from a telephone receiver includes the following steps. First, the audible signal system 42 of the telephone receiver 36 is disconnected with switch 49. Then, a pager 10 having a receiver circuit 33 capable of sensing the existence of an incoming call destined for the incoming call circuit 40 of the telephone receiver 36 is placed on the wrist of the person expecting a telephone call. The pager 10 has a silent announcing means, such as vibrator 38 and/or a strobe light 39, thereon operatively connected to the receiver circuit 33 of the pager 10. Thus, instead of or in addition to an incoming call being automatically transmitted to the incoming call circuit 40, the transmitter 44 signals to the receiver circuit 33 of the wireless receiver to actuate the vibrator 38. Depending on the position of the switch 49, the incoming call can be remotely announced with or without activating the audible signal system 42 of the telephone receiver 36. The vibrator 38 can contact the arm of the person wearing the pager 10 without disturbing anyone else near the telephone receiver 36. The vibrator on the pager 10 also does not disturb anyone near the person wearing the device.

The pager 10 can be mounted on a strap 26 and attached to a portion of the person's body, including but not limited to their wrist. The pager 10 gives the user the flexibility to move about freely within the range of the transmitter 44 without missing important incoming telephone calls or disturbing others.

In use, the audible signal generating portion of an incoming telephone call may be diverted from the incoming call circuit 40 and, thus, the audible signal system 42 will not generate any sound. Instead, the transmitter 44 will send a signal via the antenna 46 to the antenna 34 of the pager 10. The vibrator 38 and/or light 39 of the pager 10 will be activated to silently alert the user who is wearing the device.

Below are a few examples of situations when the device and method of this invention are useful. A parent could be silently alerted of an incoming call while their child or other members of the household were sleeping. The pager 10 silently alerts the wearer of incoming telephone calls during important home or business events. Meetings would not be interrupted by the noise of a ringing telephone. Also, one would have increased flexibility to move about the home, yard, or business without missing important telephone calls. The user could be cutting the grass or playing the stereo loud and still receive notice of the incoming call.

Based on the foregoing, the present invention at least achieves its stated objects.

In the drawings and specification there has been set forth a preferred embodiment of the invention, and although specific terms are employed, these are used in a generic and descriptive sense and not for purposes of limitation. Changes in the form and proportion of parts as well as in the substitution of equivalents are contemplated as circumstances may render expedient without departing from the scope of the invention as further defined in the following claims.

What is claimed is:

1. An apparatus for announcing incoming calls, comprising:

a telephone receiver having an incoming call circuit connected to an audible signal system in the telephone receiver;

a charger/transmitter operatively interposed between the telephone receiver and an incoming call, the charger/transmitter comprising a transmitter for generating a signal indicating the presence of an incoming call, an antenna for broadcasting the signal, and a switch for selectively disconnecting the incoming call from the audible signal system;

a portable pager movable remotely from the telephone receiver and having an antenna for receiving the signal broadcast by the charger/transmitter and activating a non-audible signaler on the pager in response to the signal broadcasted by the charger/transmitter.

2. An apparatus for announcing incoming calls, comprising:

a telephone receiver having an incoming call circuit connected to an audible signal system in the telephone receiver;

a charger/transmitter operatively interposed between the telephone receiver and an incoming call, the charger/transmitter comprising a transmitter for generating a signal indicating the presence of an incoming call, an antenna for broadcasting the signal, and a switch for selectively disconnecting the incoming call from the audible signal system, wherein the switch has two positions, one position wherein the incoming call is disconnected from the audible signal system by the switch, and another position wherein the incoming call is connected to the audible signal system by the switch; and a portable pager movable remotely from the telephone receiver and having an antenna for receiving the signal broadcasted by the charger/transmitter and activating a non-audible signaler on the pager in response to the signal broadcasted by the charger/transmitter.

3. An apparatus for announcing incoming calls, comprising:

a telephone receiver having an incoming call circuit connected to an audible signal system in the telephone receiver;

a charger/transmitter operatively interposed between the telephone receiver and an incoming call, the charger/transmitter comprising a transmitter for generating a signal indicating the presence of an incoming call, an antenna for broadcasting the signal, and a switch for selectively disconnecting the incoming call from the audible signal system, wherein the switch is a four-position switch having a first position wherein the incoming call is disconnected from the audible signal system by the switch and the charger/transmitter is connected to the incoming call so as to transmit a signal indicating the presence of the incoming call, a second position wherein the incoming call is connected to the audible signal system by the switch and the charger/transmitter is also connected to the incoming call so as to transmit a signal indicating the presence of the incoming call, a third position wherein the incoming call is connected to the audible signal system by the switch, but the charger/transmitter is not connected to the incoming call, and a fourth position wherein the switch disconnects the incoming call from both the audible signal system and the charger/transmitter; and a portable pager movable remotely from the telephone receiver and having an antenna for receiving the signal broadcasted by the charger transmitter and activating a non-audible signaler on the pager in response to the signal broadcasted by the charger/transmitter.

* * * * *